US009161179B2

(12) United States Patent
Anchan

(10) Patent No.: US 9,161,179 B2
(45) Date of Patent: Oct. 13, 2015

(54) ENABLING A WIRELESS COMMUNICATION DEVICE TO SWITCH FROM ONE LOCAL NETWORK TO A SEPARATE WIDE AREA NETWORK FOR A HIGH PRIORITY MULTICAST GROUP COMMUNICATION

(71) Applicant: QUALCOMM Incorporated, San Diego, CA (US)

(72) Inventor: Kirankumar Anchan, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 29 days.

(21) Appl. No.: 14/146,497

(22) Filed: Jan. 2, 2014

(65) Prior Publication Data

US 2014/0194100 A1    Jul. 10, 2014

Related U.S. Application Data

(60) Provisional application No. 61/748,838, filed on Jan. 4, 2013.

(51) Int. Cl.
*H04W 4/06* (2009.01)
*H04W 76/00* (2009.01)
*H04L 29/06* (2006.01)
*H04W 4/10* (2009.01)
*H04W 72/00* (2009.01)

(52) U.S. Cl.
CPC ............. *H04W 4/06* (2013.01); *H04L 65/403* (2013.01); *H04L 65/4076* (2013.01); *H04W 76/005* (2013.01); *H04L 65/4038* (2013.01); *H04W 4/10* (2013.01); *H04W 72/005* (2013.01)

(58) Field of Classification Search
CPC ............ H04L 65/4076; H04L 65/4038; H04L 65/403; H04W 4/10; H04W 48/18; H04W 76/005; H04W 72/005
USPC ........ 455/416, 230; 370/270, 328; 725/25, 40
See application file for complete search history.

(56) References Cited

U.S. PATENT DOCUMENTS

| 8,175,069 | B2 | 5/2012 | Wang et al. |
| 8,279,793 | B2 | 10/2012 | Cai et al. |
| 2005/0281209 | A1* | 12/2005 | Cai et al. ....................... 370/270 |

(Continued)

FOREIGN PATENT DOCUMENTS

| EP | 1684466 A1 | 7/2006 |
| WO | 2006110322 A2 | 10/2006 |
| WO | 2012063950 A1 | 5/2012 |

OTHER PUBLICATIONS

International Search Report and Written Opinion—PCT/US2014/010224—ISA/EPO—May 13, 2014.

*Primary Examiner* — Phuoc H Doan
(74) *Attorney, Agent, or Firm* — Muncy, Geissler, Olds & Lowe, P.C.

(57) ABSTRACT

The disclosure is related to group communications over multimedia broadcast/multicast services (MBMS). An aspect determines whether a number of one or more user devices in an MBMS coverage area participating in a group call is less than a threshold, and delivers a media stream for the group call to a user device of the one or more user devices over a wireless local area network (WLAN) to which the user device is connected based on the number of the one or more user devices in the MBMS coverage area being less than the threshold.

26 Claims, 13 Drawing Sheets

(56) References Cited

U.S. PATENT DOCUMENTS

| | | |
|---|---|---|
| 2007/0133527 A1 | 6/2007 | Kuure et al. |
| 2009/0185522 A1 | 7/2009 | Periyalwar et al. |
| 2011/0093880 A1* | 4/2011 | Paila et al. ............ 725/25 |
| 2012/0263089 A1 | 10/2012 | Gupta et al. |
| 2013/0028118 A1 | 1/2013 | Cherian et al. |

* cited by examiner

ENABLING A WIRELESS COMMUNICATION DEVICE TO SWITCH FROM ONE LOCAL NETWORK TO A SEPARATE WIDE AREA NETWORK FOR A HIGH PRIORITY MULTICAST GROUP COMMUNICATION

CLAIM OF PRIORITY UNDER 35 U.S.C. §119

The present Application for Patent claims priority to Provisional Application No. 61/748,838, entitled "METHOD TO ENABLE A WIRELESS COMMUNICATION DEVICE TO SWITCH FROM ONE LOCAL NETWORK TO A SEPARATE WIDE AREA NETWORK FOR A HIGH PRIORITY MULTICAST GROUP COMMUNICATION," filed Jan. 4, 2013, and assigned to the assignee hereof and hereby expressly incorporated by reference herein.

FIELD OF DISCLOSURE

The present disclosure is related to enabling a wireless communication device to switch from one local network to a separate wide area network for a high priority multicast group communication.

BACKGROUND

A cellular communication system can support bi-directional communication for multiple users by sharing the available system resources. Cellular systems are different from broadcast systems that can mainly or only support unidirectional transmission from broadcast stations to users. Cellular systems are widely deployed to provide various communication services and may be multiple-access systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc.

A cellular system may support broadcast, multicast, and unicast services. A broadcast service is a service that may be received by all users, e.g., news broadcast. A multicast service is a service that may be received by a group of users, e.g., a subscription video service. A unicast service is a service intended for a specific user, e.g., voice call. Group communications can be implemented using either unicast, broadcast, multicast or a combination of each. As the group becomes larger it is generally more efficient to use multicast services. However, for group communication services that require low latency and a short time to establish the group communication, the setup time of conventional multicast channels can be a detriment to system performance

SUMMARY

The disclosure relates to group communications over multimedia broadcast/multicast services (MBMS). A method for group communications over MBMS includes determining whether a number of one or more user devices in an MBMS coverage area participating in a group call is less than a threshold, and delivering a media stream for the group call to a user device of the one or more user devices over a wireless local area network (WLAN) to which the user device is connected based on the number of the one or more user devices in the MBMS coverage area being less than the threshold.

An apparatus for group communications over MBMS includes logic configured to determine whether a number of one or more user devices in an MBMS coverage area participating in a group call is less than a threshold, and logic configured to deliver a media stream for the group call to a user device of the one or more user devices over a wireless local area network (WLAN) to which the user device is connected based on the number of the one or more user devices in the MBMS coverage area being less than the threshold.

An apparatus for group communications over MBMS includes means for determining whether a number of one or more user devices in an MBMS coverage area participating in a group call is less than a threshold, and means for delivering a media stream for the group call to a user device of the one or more user devices over a wireless local area network (WLAN) to which the user device is connected based on the number of the one or more user devices in the MBMS coverage area being less than the threshold.

A non-transitory computer-readable medium for group communications over MBMS includes at least one instruction to determine whether a number of one or more user devices in an MBMS coverage area participating in a group call is less than a threshold, and at least one instruction to deliver a media stream for the group call to a user device of the one or more user devices over a wireless local area network (WLAN) to which the user device is connected based on the number of the one or more user devices in the MBMS coverage area being less than the threshold.

BRIEF DESCRIPTION OF THE DRAWINGS

The accompanying drawings are presented to aid in the description of embodiments of the disclosure and are provided solely for illustration of the embodiments and not limitation thereof.

DETAILED DESCRIPTION

Figure 1:
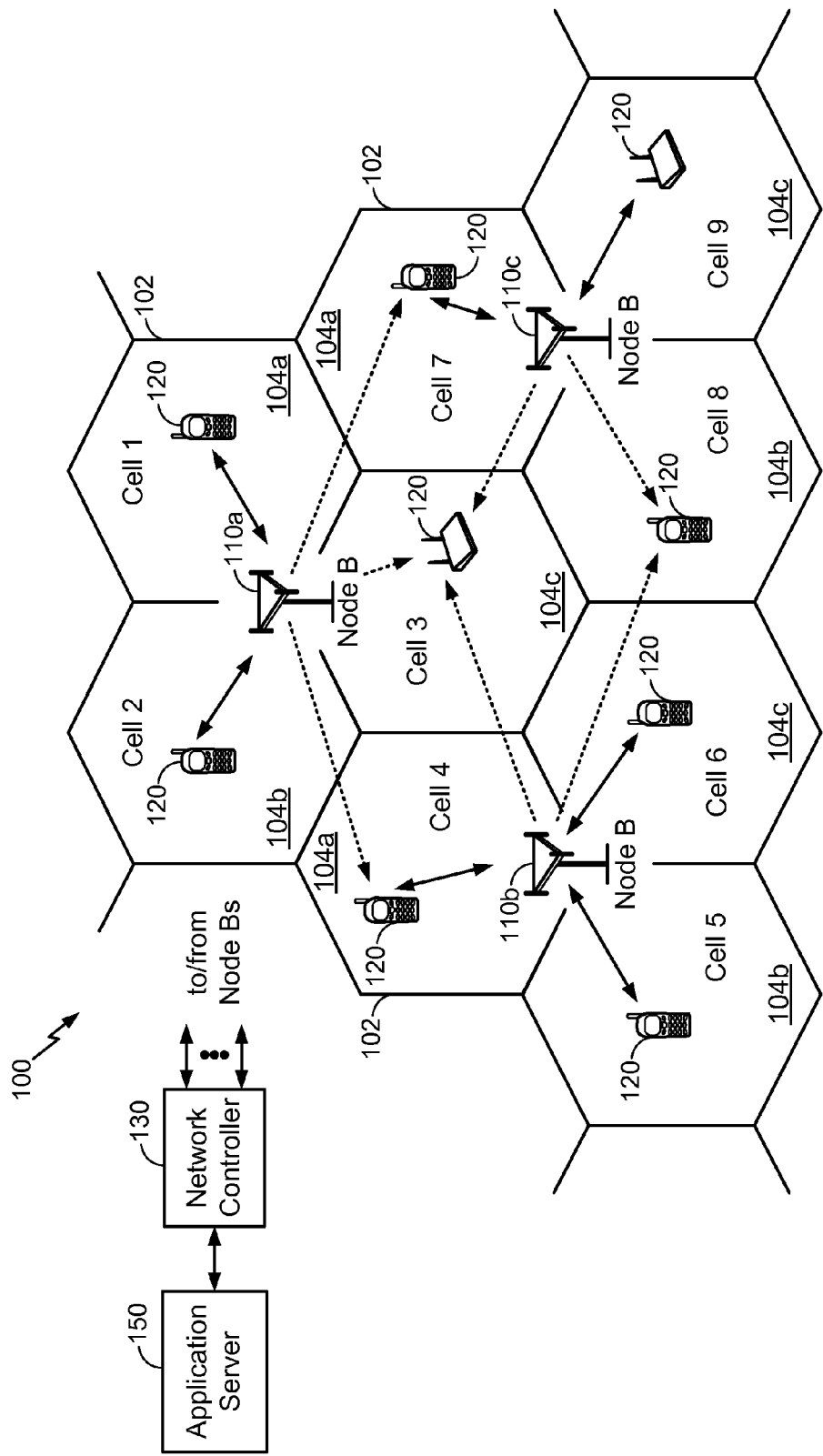
FIG. 1 illustrates a wireless communication system.

Aspects of the disclosure are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The word "exemplary" is used herein to mean "serving as an example, instance, or illustration." Any embodiment described herein as "exemplary" is not necessarily to be construed as preferred or advantageous over other embodiments. Likewise, the term "embodiments of the disclosure" does not require that all aspects of the disclosure include the discussed feature, advantage or mode of operation. Further, as used herein the term group communication, push-to-talk, or similar variations are meant to refer to a server arbitrated service between two or more devices.

The terminology used herein is for the purpose of describing particular embodiments only and is not intended to be limiting of aspects of the disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof Further, many aspects are described in terms of sequences of actions to be performed by, for example, elements of a computing device. It will be recognized that the various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspect may be described herein as, for example, "logic configured to" perform the described action.

The techniques described herein may be used for various cellular communication systems such as code division multiple access (CDMA), time division multiple access (TDMA), frequency division multiple access (FDMA), orthogonal FDMA (OFDMA), and single-carrier FDMA (SC-FDMA) systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

FIG. 1 illustrates a cellular communication system 100, which may be, for example, an LTE system. System 100 may include a number of Node Bs and other network entities. For simplicity, only three Node Bs 110a, 110b and 110c are shown in FIG. 1. A Node B may be a fixed station used for communicating with user equipments (UEs) and may also be referred to as, for example, an evolved Node B (eNB), a base station, or an access point. Each Node B 110 provides communication coverage for a particular geographic area 102. To improve system capacity, the overall coverage area of a Node B 110 may be partitioned into multiple smaller areas, for example, three smaller areas 104a, 104b and 104c. Each smaller area may be served by a respective Node B subsystem. In 3GPP, the term "cell" can refer to the smallest coverage area of a Node B and/or a Node B subsystem serving this coverage area. In other systems, the term "sector" can refer to the smallest coverage area of a base station and/or a base station subsystem serving this coverage area. For clarity, the 3GPP concept of a cell is used in the description below.

In the example shown in FIG. 1, each Node B 110 has three cells that cover different geographic areas. For simplicity, FIG. 1 shows the cells not overlapping one another. In a practical deployment, however, adjacent cells typically overlap one another at the edges, which may allow a UE 120 to receive coverage from one or more cells at any location as the UE 120 moves about the system 100.

UEs 120 may be dispersed throughout the system 100, and each UE 120 may be stationary or mobile. A UE may also be referred to as, for example, a mobile station, a terminal, an access terminal, a subscriber unit, or a mobile station. A UE may be a cellular telephone, a "smartphone," a personal digital assistant (PDA), a wireless modem, a wireless communication device, a handheld device, a laptop computer, a cordless phone, etc. A UE 120 may communicate with a Node B 110 via transmissions on the downlink and uplink. The downlink (or forward link) refers to the communication link from the Node B to the UE, and the uplink (or reverse link) refers to the communication link from the UE to the Node B. In FIG. 1, a solid line with double arrows indicates bi-directional communication between a Node B and a UE. A dashed line with a single arrow indicates a UE receiving a downlink signal from a Node B, for example, for broadcast and/or multicast services. The terms "UE" and "user" are used interchangeably herein.

Network controller 130 may couple to multiple Node Bs 110 to provide coordination and control for the Node Bs 110 under its control, and to route data for UEs 120 served by these Node Bs 110. System 100 may also include other network entities not shown in FIG. 1. Further, as illustrated, network controller 130 may be operably coupled to an application server 150 to provide group communication services to the various UEs 120 through system 100. It will be appreciated that there can be many other network and system entities that can be used to facilitate communications between the UEs 120 and servers and information outside of the system 100. Accordingly, the various aspects disclosed herein are not limited to the specific arrangement or elements detailed in the various figures.

Figure 2:
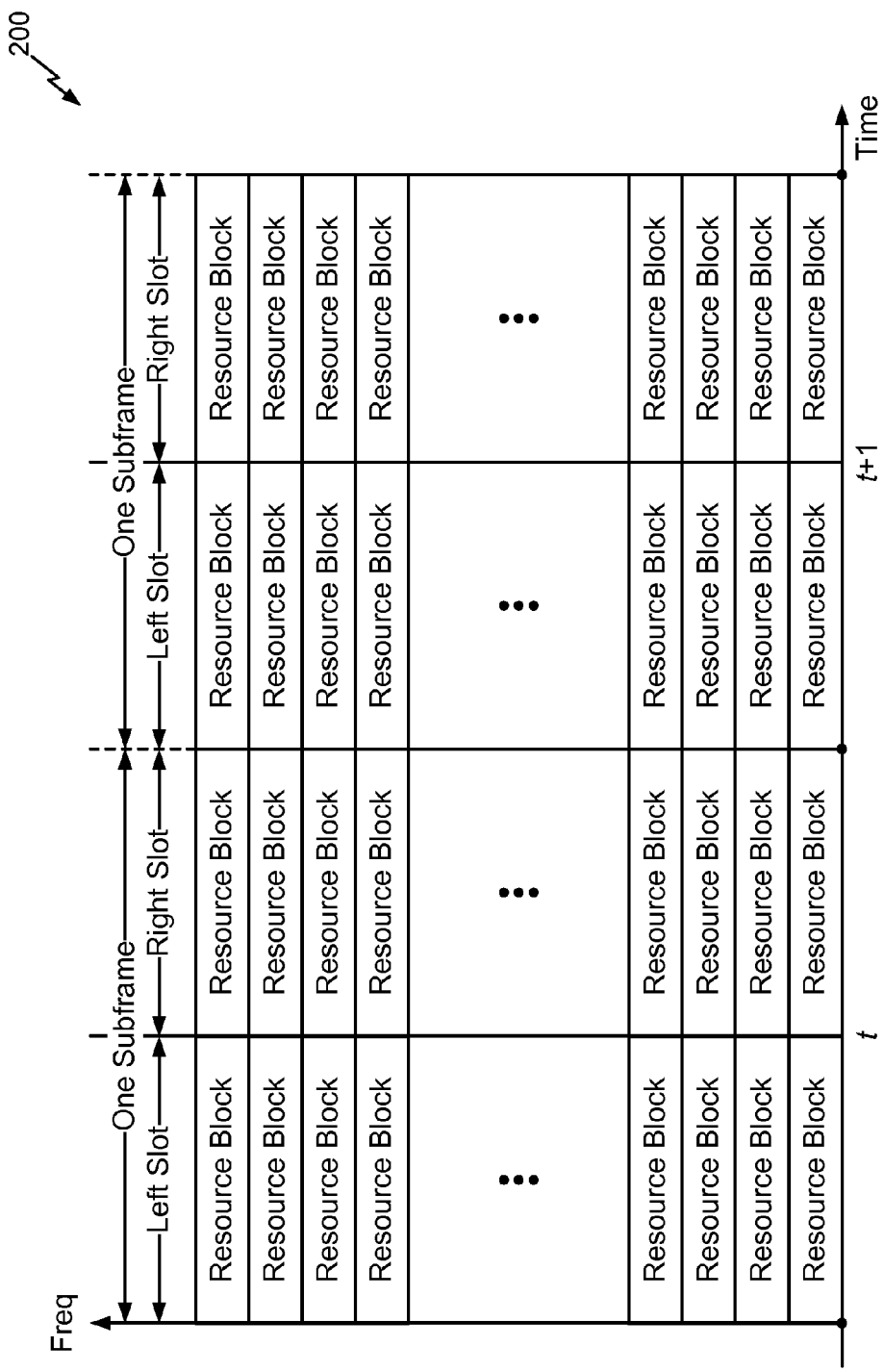
FIG. 2 illustrates an example transmission structure.

FIG. 2 illustrates an example transmission structure 200 that may be used for the downlink in system 100. The transmission timeline may be partitioned into units of radio frames. Each radio frame may have a predetermined duration (e.g., 10 milliseconds (ms)) and may be partitioned into 10 sub-frames. Each sub-frame may include two slots, and each slot may include a fixed or configurable number of symbol periods, for example, six or seven symbol periods.

The system bandwidth may be partitioned into multiple (K) subcarriers with orthogonal frequency division multiplexing (OFDM). The available time frequency resources may be divided into resource blocks. Each resource block may include Q subcarriers in one slot, where Q may be equal to 12 or some other value. The available resource blocks may be used to send data, overhead information, pilot, etc.

The system 100 may support evolved multimedia broadcast/multicast services (eMBMS) for multiple UEs as well as unicast services for individual UEs. A service for eMBMS may be referred to as an eMBMS service or flow and may be a broadcast service/flow or a multicast service/flow.

In LTE, data and overhead information are processed as logical channels at a Radio Link Control (RLC) layer. The logical channels are mapped to transport channels at a Medium Access Control (MAC) layer. The transport channels are mapped to physical channels at a physical layer (PHY). Table 1 lists some logical channels (denoted as "L"), transport channels (denoted as "T"), and physical channels (denoted as "P") used in LTE and provides a short description for each channel.

TABLE 1

| Name | Channel | Type | Description |
|---|---|---|---|
| Broadcast Control Channel | BCCH | L | Carry system information |
| Broadcast Channel | BCH | T | Carry master system Information |
| eMBMS Traffic Channel | MTCH | L | Carry configuration information for eMBMS services. |
| Multicast Channel | MCH | T | Carry the MTCH and MCCH |
| Downlink Shared Channel | DL-SCH | T | Carry the MTCH and other logical channels |
| Physical Broadcast Channel | PBCH | P | Carry basic system information for use in acquiring the system. |
| Physical Multicast Channel | PMCH | P | Carry the MCH. |
| Physical Downlink Shared Channel | PDSCH | P | Carry data for the DL-SCH |
| Physical Downlink Control Channel | PDCCH | P | Carry control information for the DL-SCH |

As shown in Table 1, different types of overhead information may be sent on different channels. Table 2 lists some types of overhead information and provides a short description for each type. Table 2 also gives the channel(s) on which each type of overhead information may be sent, in accordance with one design.

TABLE 2

| Overhead Information | Channel | Description |
|---|---|---|
| System Information | BCCH | Information pertinent for communicating with and/or receiving data from the system. |
| Configuration Information | MCCH | Information used to receive the Information services, e.g., MBSFN Area Configuration, which contains PMCH configurations, Service ID, Session ID, etc. |

TABLE 2-continued

| Overhead Information | Channel | Description |
|---|---|---|
| Control Information | PDCCH | Information used to receive Information transmissions of data for the services, e.g., resource assignments, modulation and coding schemes, etc. |

The different types of overhead information may also be referred to by other names. The scheduling and control information may be dynamic whereas the system and configuration information may be semi-static.

The system may support multiple operational modes for eMBMS, which may include a multi-cell mode and a single-cell mode. The multi-cell mode may have the following characteristics:
  Content for broadcast or multicast services can be transmitted synchronously across multiple cells.
  Radio resources for broadcast and multicast services are allocated by an MBMS Coordinating Entity (MCE), which may be logically located above the Node Bs.
  Content for broadcast and multicast services is mapped on the MCH at a Node B.
  Time division multiplexing (e.g., at the sub-frame level) of data for broadcast, multicast, and unicast services.

The single-cell mode may have the following characteristics:
  Each cell transmits content for broadcast and multicast services without synchronization with other cells.
  Radio resources for broadcast and multicast services are allocated by the Node B.
  Content for broadcast and multicast services is mapped on the DL-SCH.
  Data for broadcast, multicast, and unicast services may be multiplexed in any manner allowed by the structure of the DL-SCH.

Figure 3:
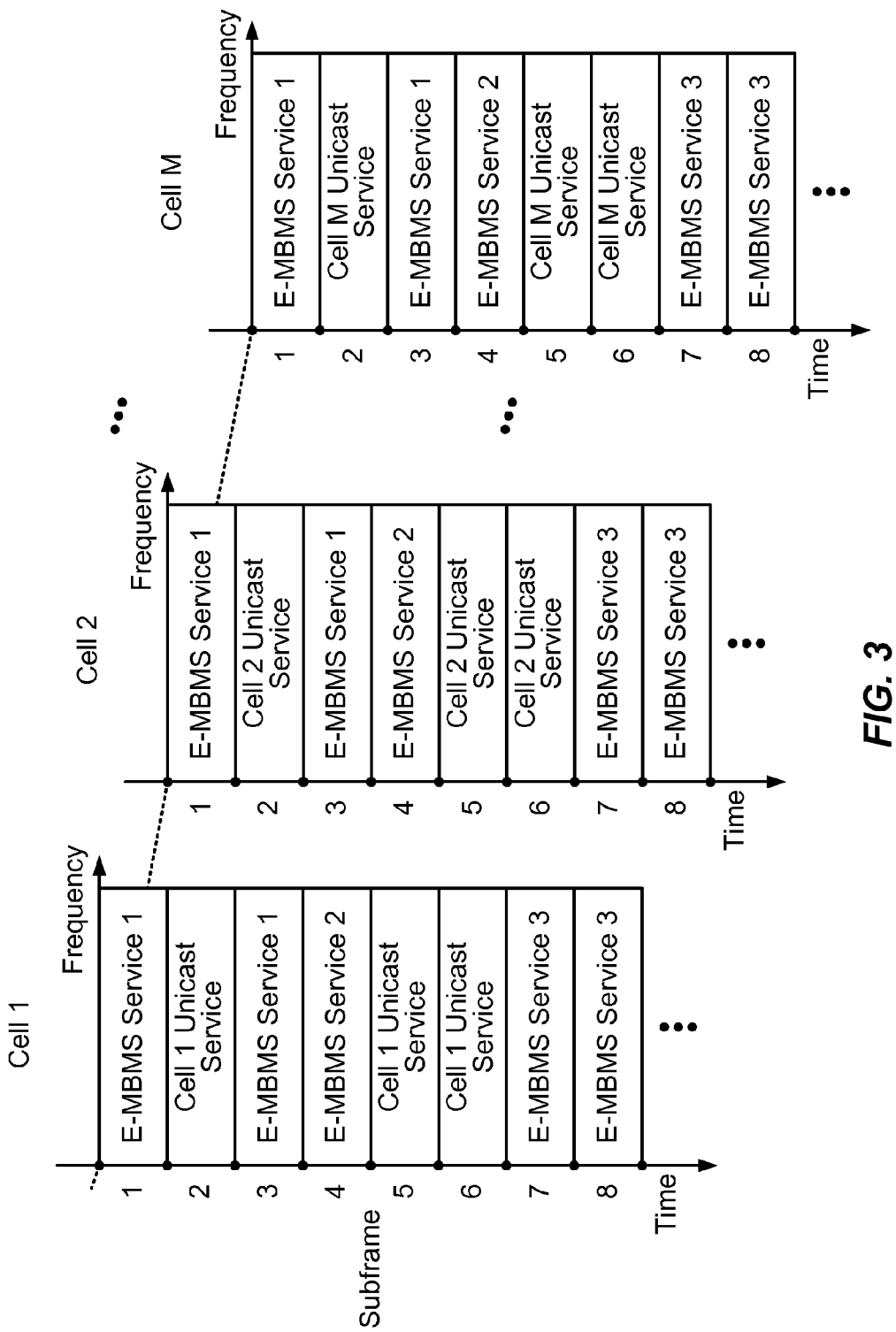
FIG. 3 illustrates example transmissions of different services in a multi-cell mode.

In general, eMBMS services may be supported with the multi-cell mode, the single-cell mode, and/or other modes. The multi-cell mode may be used for eMBMS multicast/broadcast single frequency network (MBSFN) transmission, which may allow a UE to combine signals received from multiple cells in order to improve reception performance FIG. 3 illustrates example transmissions of eMBMS and unicast services by M cells 1 through M in the multi-cell mode, where M may be any integer value. For each cell, the horizontal axis may represent time, and the vertical axis may represent frequency. In one design of eMBMS, which is assumed for much of the description below, the transmission time line for each cell may be partitioned into time units of sub-frames. In other designs of eMBMS, the transmission time line for each cell may be partitioned into time units of other durations. In general, a time unit may correspond to a sub-frame, a slot, a symbol period, multiple symbol periods, multiple slots, multiple sub-frames, etc.

In the example shown in FIG. 3, the M cells transmit three eMBMS services 1, 2, and 3. All M cells transmit eMBMS service 1 in sub-frames 1 and 3, eMBMS service 2 in sub-frame 4, and eMBMS service 3 in sub-frames 7 and 8. The M cells transmit the same content for each of the three eMBMS services. Each cell may transmit its own unicast service in sub-frames 2, 5 and 6. The M cells may transmit different contents for their unicast services.

Figure 4:
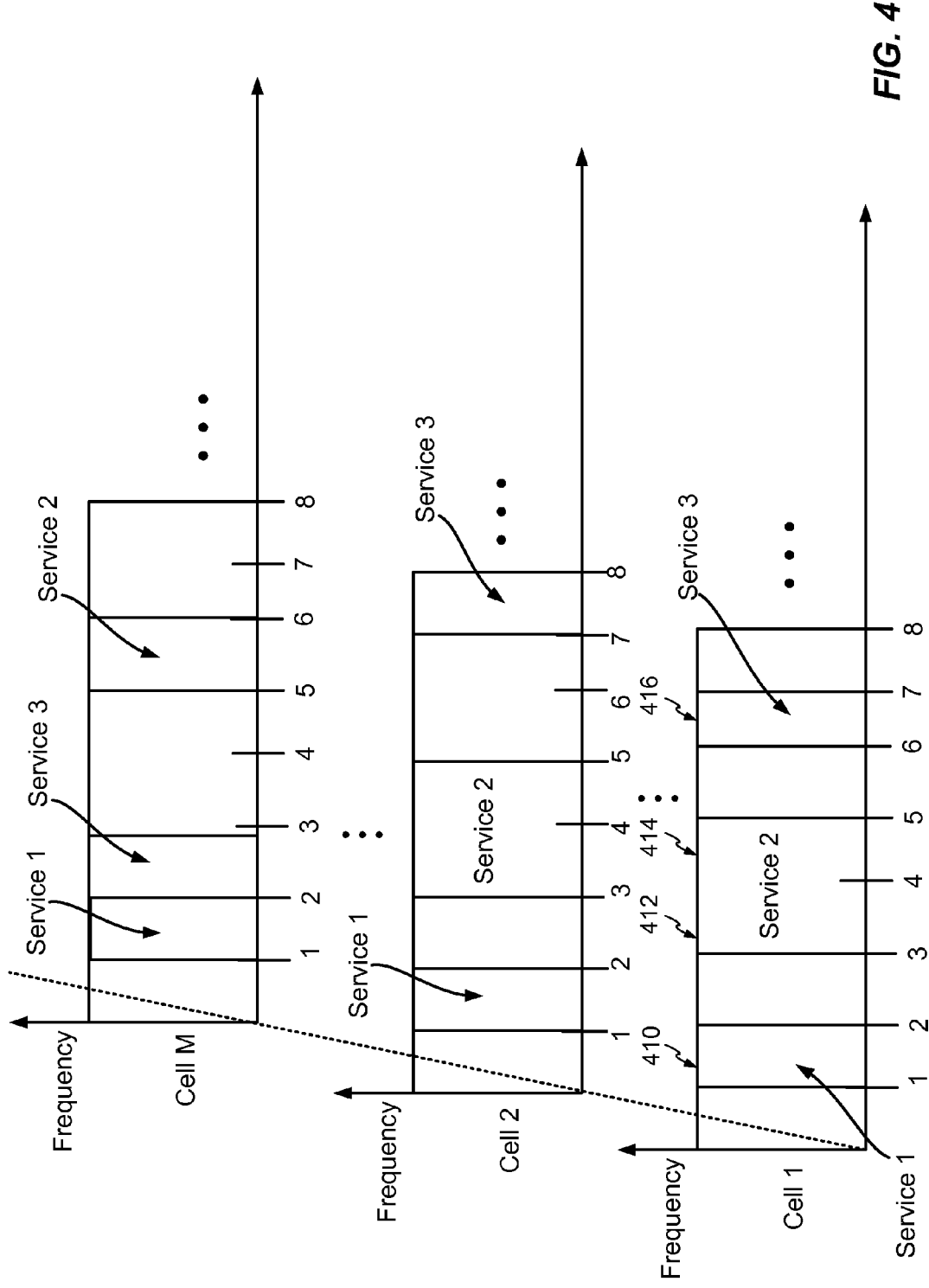
FIG. 4 illustrates example transmissions of different services in a single-cell mode.

FIG. 4 illustrates example transmissions of eMBMS and unicast services by M cells in the single-cell mode. For each cell, the horizontal axis may represent time and the vertical axis may represent frequency. In the example shown in FIG.

4, the M cells transmit three eMBMS services 1, 2, and 3. Cell 1 transmits eMBMS service 1 in one time frequency block 410, eMBMS service 2 in a time frequency blocks 412 and 414, and eMBMS service 3 in one time frequency block 416. Similarly other cells transmit services 1, 2, and 3 as shown in the FIG. 4.

In general, an eMBMS service may be sent in any number of time frequency blocks. The number of sub-frames may be dependent on the amount of data to send and possibly other factors. The M cells may transmit the three eMBMS services 1, 2, and 3 in time frequency blocks that may not be aligned in time and frequency, as shown in FIG. 4. Furthermore, the M cells may transmit the same or different contents for the three eMBMS services. Each cell may transmit its own unicast service in remaining time frequency resources not used for the three eMBMS services. The M cells may transmit different contents for their unicast services.

As discussed, FIGS. 3 and 4 illustrate example designs of transmitting eMBMS services in the multi-cell mode and the single-cell mode. eMBMS services may also be transmitted in other manners in the multi-cell and single-cell modes, for example, using time division multiplexing (TDM).

As noted in the foregoing, eMBMS services can be used to distribute multicast data to groups and could be useful in group communication systems (e.g., Push-to-Talk (PTT) calls). Conventional applications on eMBMS have a separate service announcement/discovery mechanism. Further, communications on pre-established eMBMS flows are always-on even on the air interface. Power saving optimization must be applied to put the UE to sleep when a call/communication is not in progress. This is typically achieved by using out of band service announcements on unicast or multicast user plane data. Alternatively, an application layer paging channel-like mechanism may be used. Since the application layer paging mechanism has to remain active, it consumes bandwidth on the multicast sub-frame which could be idle in the absence of the paging mechanism. Additionally, since the multicast sub-frame will be active while using the application layer paging, the remainder of the resource blocks within the sub-frame cannot be used for unicast traffic. Thus, the total 5 MHz bandwidth will be consumed for the sub-frame for instances when application layer paging is scheduled without any other data.

Figure 5A:
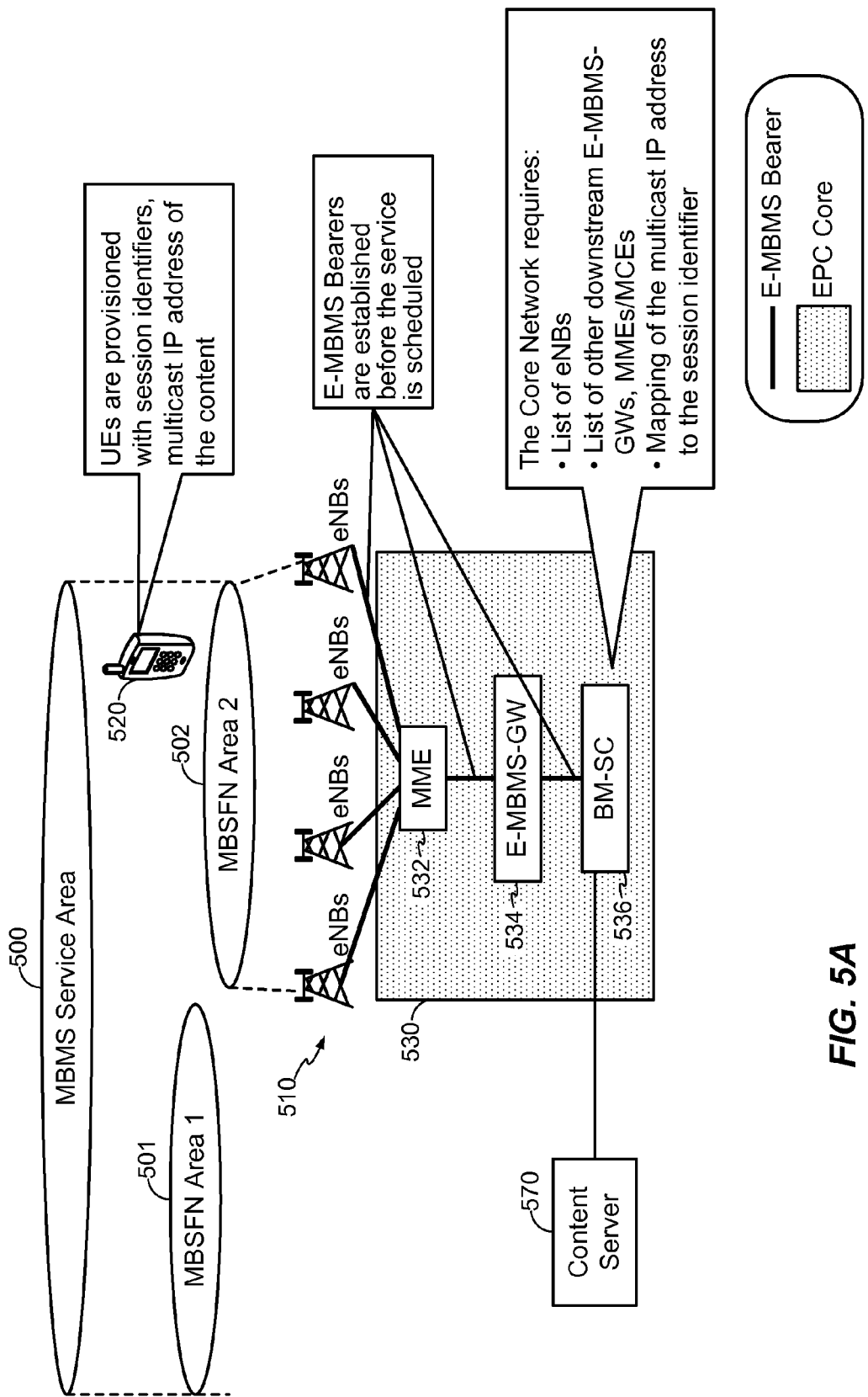
FIGS. 5A and 5B illustrate additional wireless communication systems that can support broadcast/multicast services.

FIG. 5A is another illustration of a wireless network that can implement eMBMS or MBMS services, which are used interchangeably herein. An MBMS service area 500 can include multiple MBSFN areas (e.g., MBSFN area 1 501 and MBSFN area 2 502). Each MBSFN area can be supported by one or more eNode Bs 510, which are coupled to a core network 530. Core network 530 can include various elements (e.g., MME 532, eMBMS gateway 534, and broadcast multicast service center (BM-SC) 536) to facilitate controlling and distributing the content from content provider 570 (which may include an application server, such as application server 150 in FIG. 1) to the MBMS service area 500. The core network 530 may require a list of eNode Bs within the network, a list of other downstream eMBMS-GWs 534, Mobility Management Entities (MMEs)/MCEs 532, and a mapping of the multicast IP address to the session identifier. UE 520 within the network can be provisioned with session identifiers and multicast IP address of the content sent to it.

Typically, an MME 532 is a key control node for the LTE access network. It is responsible for idle mode UE tracking and paging procedures including retransmissions. It is involved in the bearer activation/deactivation process and is also responsible for choosing the SGW for a UE at the initial attach and at the time of intra-LTE handover involving core network 530 node relocation. The MME 532 is also responsible for authenticating the user. The MME 532 can also check the authorization of the UE to camp on the service provider's Public Land Mobile Network (PLMN) and enforces UE roaming restrictions. The MME 532 is the termination point in the network for ciphering/integrity protection for Non Access Stratum (NAS) signaling and handles the security key management. The MME 532 also provides the control plane function for mobility between LTE and 2G/3G access networks with S3 interface terminating at the MME 532.

Figure 5B:
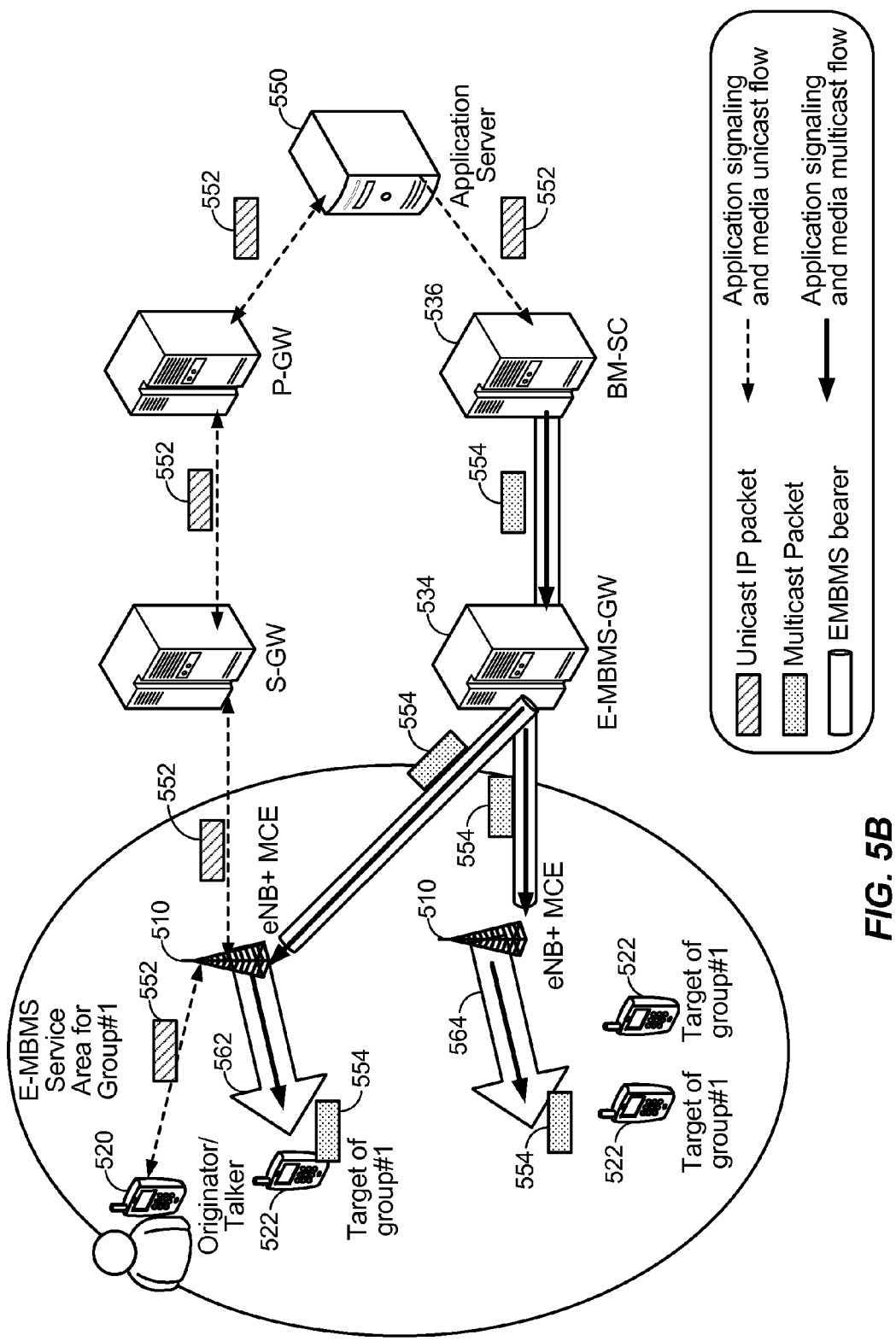

FIG. 5B is another illustration of a wireless network that can implement MBMS as disclosed herein. In the illustrated network, an application server 550 (e.g., a PTT server) can serve as the content server. The application server 550 can communicate media in unicast packets 552 to the network core where the content can be maintained in a unicast configuration and transmitted as unicast packets to a given UE (e.g., originator/talker 520) or can be converted through the BM-SC 536 to multicast packets 554, which can then be transported to target UEs 522. For example, a PTT call can be initiated by UE 520 by communicating with application server 550 via unicast packets 552 over a unicast channel. It will be noted that for the call originator/call talker, both the application signaling and media are communicated via the unicast channel on the uplink or the reverse link. The application server 550 can then generate a call announce/call setup request and communicate these to the target UEs 522. The communication can be communicated to the target UEs 522 via multicast packets 554 over a multicast flow, as illustrated in this particular example.

Further, it will be appreciated that, in this example, both the application signaling and media can be communicated over the multicast flow in the downlink or the forward link. Unlike conventional systems, having both the application signaling and the media in the multicast flow avoids the need for having a separate unicast channel for the application signaling. However, to allow for application signaling over the multicast flow of the illustrated system, an evolved packet system (EPS) bearer can be established (and persistently on) between the BM-SC 536, eMBMS GW 534, eNBs 510 and target UEs 522.

In accordance with various embodiments disclosed herein, some of the downlink channels related to eMBMS will be further discussed, which include:

MCCH: Multicast Control Channel;
MTCH: Multicast Traffic Channel;
MCH: Multicast Channel; and
PMCH: Physical Multicast Channel.

It will be appreciated that multiplexing of eMBMS and unicast flows are realized in the time domain only. The MCH is transmitted over an MBSFN in specific sub-frames on the physical layer. The MCH is a downlink only channel. A single transport block is used per sub-frame. Different services (MTCHs) can be multiplexed in this transport block, as will be illustrated in relation to FIG. 6.

To achieve low latency and reduce control signaling, one eMBMS flow (e.g., 562 or 564) can be activated for each service area. Depending on the data rate, multiple multicast flows can be multiplexed on a single slot. Target UEs can ignore and "sleep" between scheduled sub-frames and reduce power consumption when no unicast data is scheduled for the UE. The MBSFN sub-frame can be shared by groups in the same MBSFN service area. MAC layer signaling can be leveraged to "wake-up" the application layer (e.g., PTT application) for the target UEs.

Aspects of the disclosure can use two broadcast streams, each a separate eMBMS flow over an LTE broadcast flow, with its own application level broadcast stream and its own multicast IP address for each defined broadcast region 502, 501 (e.g., a subset of sectors within the network). Although illustrated as separate regions, it will be appreciated that the broadcast areas 502, 501 may overlap.

In LTE, the control and data traffic for multicast is delivered over the MCCH and MTCH, respectively. The Medium Access Control Protocol Data Units (MAC PDUs) for the UEs indicate the mapping of the MTCH and the location of the particular MTCH within a sub-frame. An MCH Scheduling Information (MSI) MAC control element is included in the first sub-frame allocated to the MCH within the MCH scheduling period to indicate the position of each MTCH and unused sub-frames on the MCH. For eMBMS user data, which is carried by the MTCH logical channel, MCH scheduling information (MSI) periodically provides, at lower layers (e.g., MAC layer information), the information on decoding the MTCH. The MSI scheduling can be configured and, according to an aspect, is scheduled before the MTCH sub-frame interval.

Providing wireless multicast services, such as MBMS or eMBMS, in a given service area can be a waste of resources when there are only a few users in the area using the service. Accordingly, the various aspects of the disclosure leverage wireless local area networks (WLANs), such as Wi-Fi networks, available to users within the service area to augment the bandwidth of the wireless multicast service. When there are less than a threshold number of users in the service area receiving multicast data, the application server can deliver the multicast data to the users over the available WLANs at a lower bandwidth and with a lower quality of service than could be provided by the wireless multicast service. When there are a threshold number of users in the service area receiving multicast data, the application server can switch the users to the higher bandwidth wireless multicast service.

Figure 6:
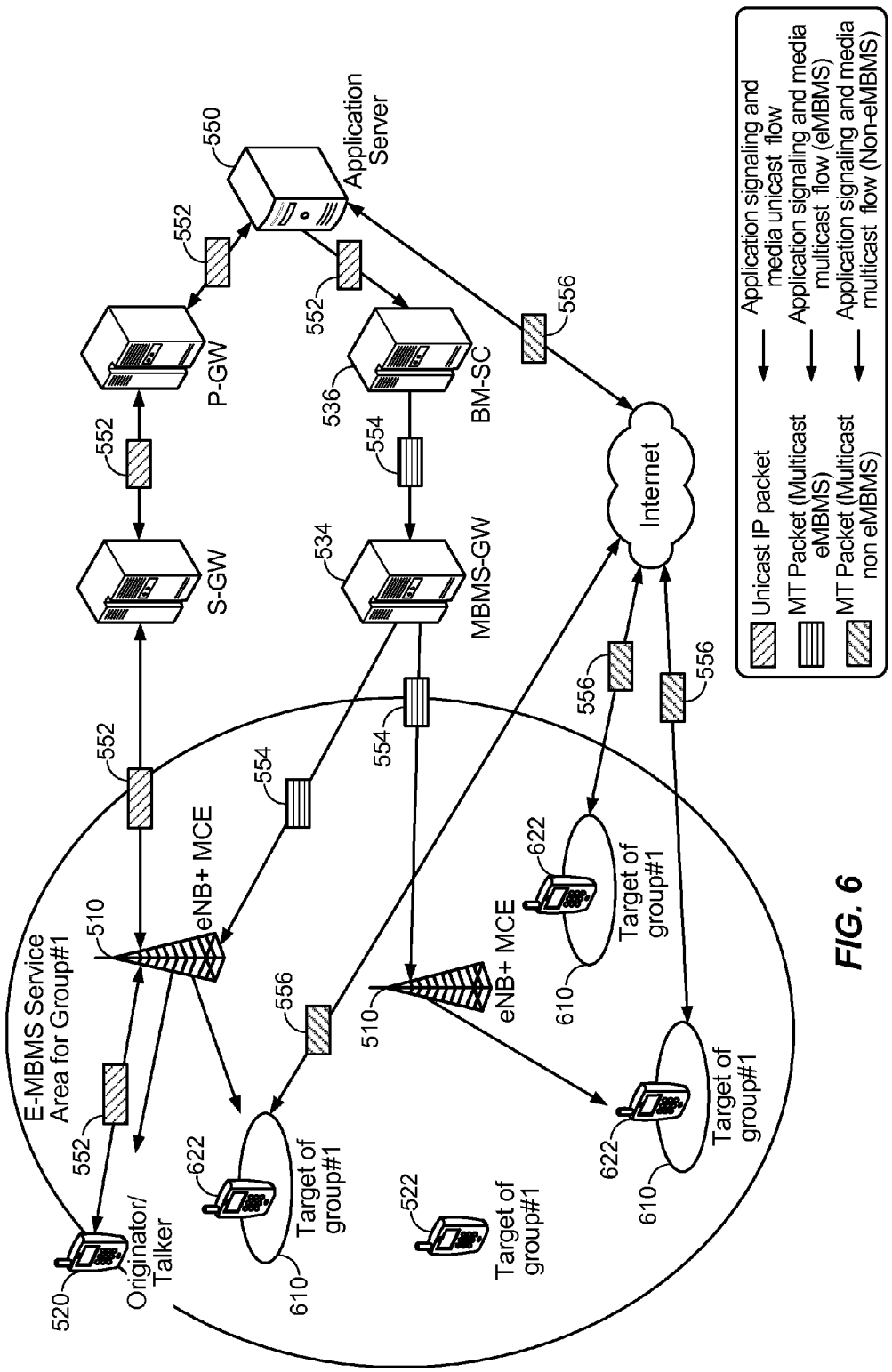
FIG. 6 illustrates a wireless network that can implement wireless multicast services as disclosed herein.

FIG. 6 illustrates a wireless network that can implement wireless multicast services as disclosed herein. The network illustrated in FIG. 6 is similar to the network illustrated in FIG. 5B, and the same reference numbers are used to refer to elements that are the same in both FIGS. 5B and 6.

In the network illustrated in FIG. 6, the application server 550 can serve as the content server, such as content server 570 in FIG. 5A. The application server 550 can communicate media in unicast packets 552 to the network core where the content can be maintained in a unicast configuration and transmitted as unicast packets to a given UE (e.g., originator/talker 520) or can be converted through the BM-SC 536 to multicast packets 554, which can then be transported to target UEs 522. For example, a PTT group call can be initiated by UE 520 by communicating with application server 550 via unicast packets 552 over a unicast channel. It will be noted that for the call originator/call talker, both the application signaling and media are communicated via the unicast channel on the uplink or the reverse link. The application server 550 can then generate a call announce/call setup request and communicate these to the target UEs 522. The communication can be communicated to the target UEs 522 via multicast packets 554 over a multicast flow, as illustrated in this particular example. Further, it will be appreciated that, in this example, both the application signaling and media can be communicated over the multicast flow in the downlink or the forward link.

In the example of FIG. 6, UEs 622 can access the network over eNBs 510 or WLANs 610. Generally, accessing the network over a WLAN costs less than accessing the network over eMBMS. When there are less than a threshold number of UEs in the eMBMS coverage area receiving multicast data, the application server 550 can deliver the multicast data to the UEs 622 over the available WLANs 610 as non-eMBMS multicast packets 556. When there are a threshold number of UEs in the eMBMS coverage area receiving multicast data, the application server 550 can establish the eMBMS for the coverage area and switch the UEs to the established eMBMS.

Figure 7:
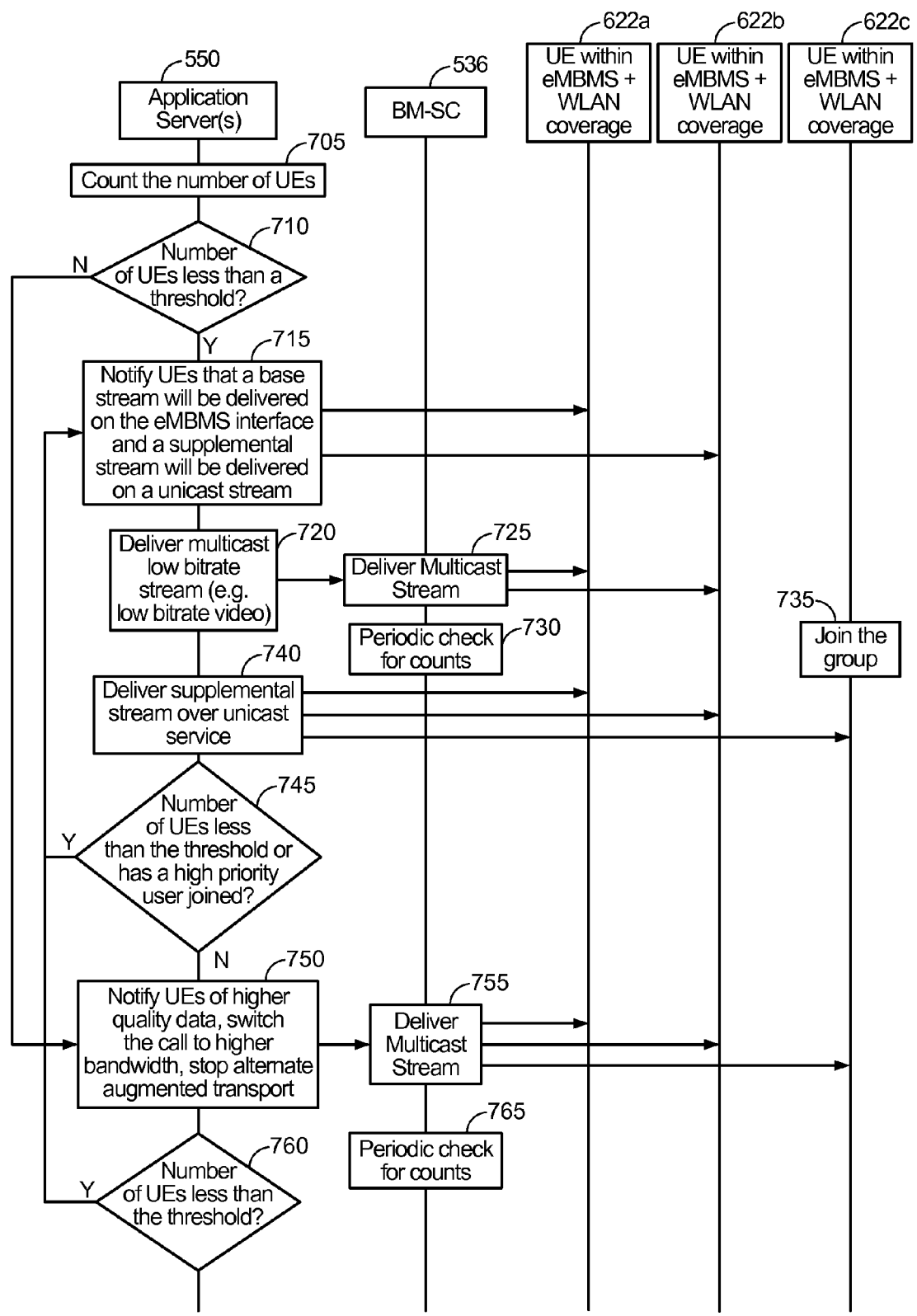
FIG. 7 illustrates an exemplary flow for group communications over MBMS that may be performed in the network illustrated in FIG. 6.

FIG. 7 illustrates an exemplary flow for group communications over MBMS that may be performed in the network illustrated in FIG. 6. Initially, the UEs 622a-c register with the application server 550 and notify it of their capabilities, environment variables, and the supported interfaces, e.g., eMBMS, unicast LTE, or WLAN connections, and the respective IP addresses. At 705, the application server 550 counts the number of UEs in a given MBSFN area, and transmits the count number to the BM-SC 536. In FIG. 7, the members of the group communication are illustrated as UE 622a and UE 622b, although it is apparent that there may be many other members. Both UE 622a and UE 622b are illustrated as being within an eMBMS coverage area and having access to the network over a WLAN, such as a Wi-Fi network. However, as is apparent, not all members of the group communication in an eMBMS coverage area may have WLAN access.

At 710, based on the count of UEs in 705, the application server 550 determines whether or not the number of active UEs in the multicast coverage area, such as an MBSFN coverage area, is less than a threshold. If it is not, then the flow advances to 750. If it is, however, then at 715, the application server notifies the UEs that a low bitrate version of the multicast stream for the group communication will be delivered on the eMBMS interface while a supplemental stream augmenting the low bitrate version of the multicast stream will be delivered on the unicast interface. The UE can combine the two streams for a richer experience. Alternatively, the application server 550 may decide to deliver all the content on the unicast interface.

At 720, the application server 550 delivers the low bitrate version of the multicast stream for the group communication to the BM-SC 536 to forward to the members capable of network access over eMBMS, i.e., UEs 622a and 622b. As an example, the low bitrate version of the multicast stream may be a low bitrate version of the video stream for the group communication. At 725, the BM-SC 536 delivers the low bitrate multicast stream to UE 622a and UE 622b over the eMBMS infrastructure.

At 730, the BM-SC 536 performs a periodic check of the number of UEs in the multicast coverage area that are active, e.g., on a group call. At 735, UE 622c joins the group call with UEs 622a 622b. Like UEs 622a and 622b, UE 622c is within the eMBMS coverage area and has access to the network over a WLAN. The UE 622c initially receives the multicast stream for the group call over the eMBMS, as the multicast stream is not being transmitted over a wireless multicast service.

At 740, the application server 550 delivers a supplemental data stream to the members of the group call (UEs 622a-c) over unicast services. For example, the application server 550 may deliver a high-definition (HD) audio stream to augment the low bitrate video stream. The application server 550 delivers this supplemental data stream to UEs 622a-c, as UE 622c is now a member of the group call.

At 745, the application server 550 again determines whether the number of UEs in the multicast coverage area is less than the threshold. The application server 550 also determines whether a high priority user has joined the call. If either condition is true, the flow returns to 715. Because UE 622c has joined the group call, however, the UE count has reached the threshold. Thus, at 750, the application server 550 notifies the UEs 622*a-c* that they will now receive a higher quality multicast stream. The application server 550 establishes the higher bandwidth multicast service, switches the call to the higher bandwidth multicast service, and stops the alternate augmented transport over the unicast service(s). Alternatively, instead of switching the group call to the higher bandwidth multicast service when the threshold number of UEs is reached, the application server 550 can switch when one or more high priority users join a call.

At 755, the BM-SC 536 delivers the higher bandwidth multicast stream to UEs 622*a-c*. At 760, the application server 550 again determines whether or not the number of active UEs in the multicast coverage area is lower than the threshold. If it is, then the flow returns to 715. If it is not, however, then the application server 550 continues to provide the higher bandwidth multicast service to the UEs.

At 765, the BM-SC 536 performs another periodic check to determine the number of active UEs in the multicast coverage area. The application server 550 and the BM-SC 536 may perform these checks after a certain period of time, for example, every few seconds to every few minutes, or upon the occurrence of certain events, for example, a UE initiating a group call, or a UE joining a group call.

Figure 8:
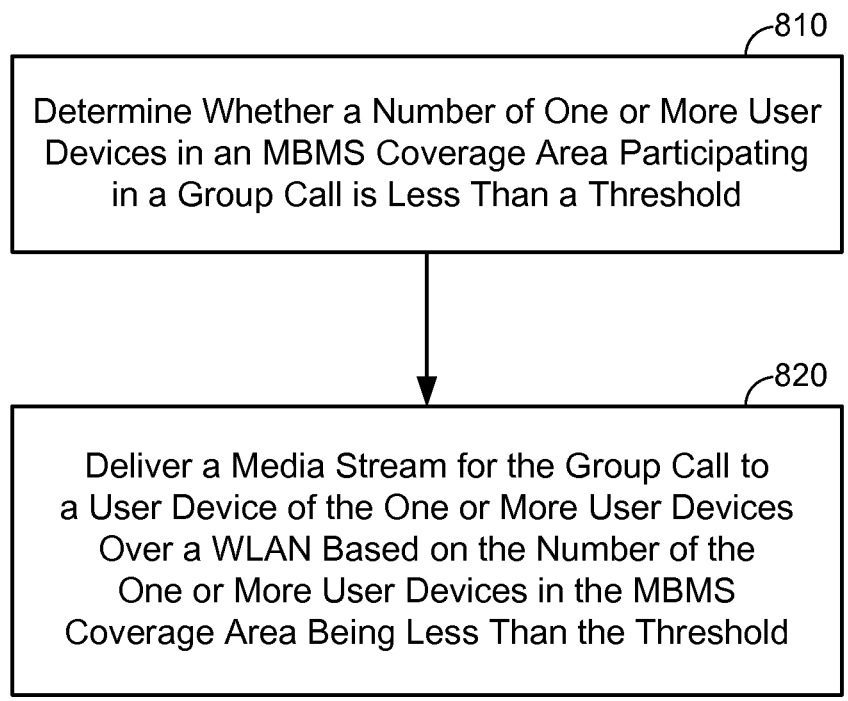
FIG. 8 illustrates an exemplary flow for group communications over MBMS according to an aspect of the disclosure.

FIG. 8 illustrates an exemplary flow for group communications over MBMS according to an aspect of the disclosure. The flow illustrated in FIG. 8 may be performed by an application server, such as application server 550 in FIG. 6. At 810, the application server determines whether a number of one or more user devices in an MBMS coverage area participating in a group call is less than a threshold. At 820, the application server delivers a media stream for the group call to a user device of the one or more user devices over a WLAN based on the number of user devices in the MBMS coverage area being less than the threshold.

Figure 9:
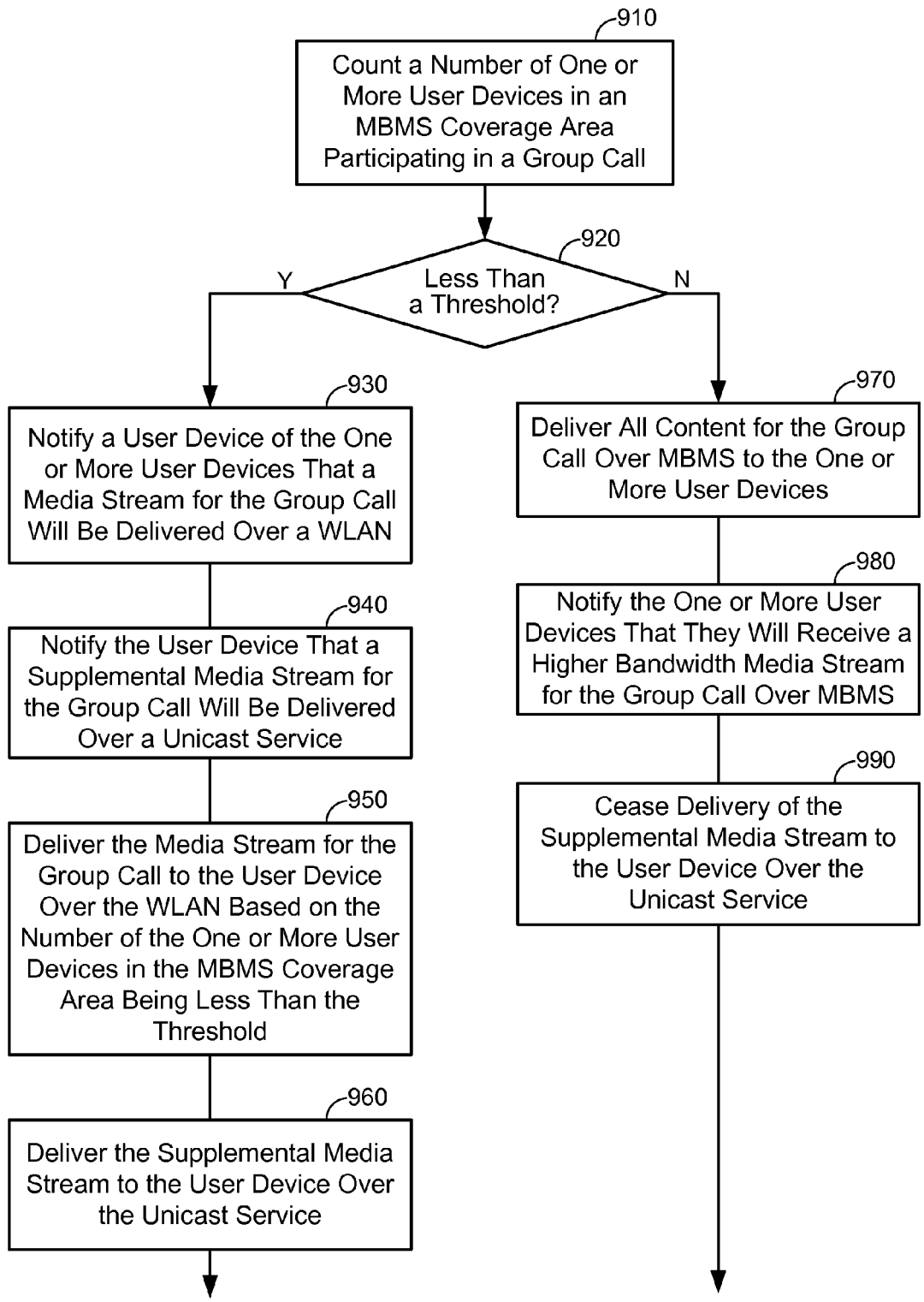
FIG. 9 illustrates another exemplary flow for group communications over MBMS according to an aspect of the disclosure.

FIG. 9 illustrates another exemplary flow for group communications over MBMS according to an aspect of the disclosure. The flow illustrated in FIG. 9 may be performed by an application server, such as application server 550 in FIG. 6.

At 910, the application server counts the number of one of more user devices in an MBMS coverage area participating in a group. At 920, the application server determines whether or not the number of the one or more user devices in the MBMS coverage area participating in the group call is less than a threshold.

If the number of the one or more user devices in the MBMS coverage area participating in the group call is less than the threshold, then at 930, the application server notifies a user device of the one or more user devices that a media stream for the group call will be delivered over a WLAN. The media stream may be group communication media generated during the group call. The media stream may also be a lower bandwidth version of the group communication media generated during the group call than would be delivered over MBMS. The media stream may be an audio stream, an image stream, and/or a video stream.

At 940, the application server notifies the user device that a supplemental media stream for the group call will be delivered over a unicast service. The supplemental media stream may be encoded at a higher bitrate than an encoding bitrate of the media stream. The supplemental media stream may be an audio stream, an image stream, and/or a video stream.

At 950, the application server delivers a media stream for the group call to a user device of the one or more user devices over a WLAN to which the user device is connected based on the number of user devices in the MBMS coverage area being less than the threshold.

At 960, the application server delivers the supplemental media stream to the user device over the unicast service. The user device may combine the media stream and the supplemental media stream for playback at the user device.

Although not shown, the application server may also deliver the media stream to a second user device of the one or more user devices over a unicast service based on whether the second user device is connected to a WLAN. Specifically, the application server may deliver the media stream to the second user device over the unicast service if the second user device is not connected to a WLAN.

If, however, the number of the one or more user devices in the MBMS coverage area participating in the group call is not less than the threshold, then at 970, the application server delivers all content for the group call over MBMS to the one or more user devices. Alternatively, or additionally, the application server may perform the delivering in 970 in response to determining that a high priority user has joined the group call.

At 980, the application server notifies the one or more user devices that the one or more user devices will receive a higher bandwidth media stream for the group call over MBMS. The higher bandwidth media stream may be a higher bandwidth version of the media stream that was delivered over the WLAN.

At 990, the application server ceases delivery of the supplemental media stream to the user device over the unicast service.

Figure 10:
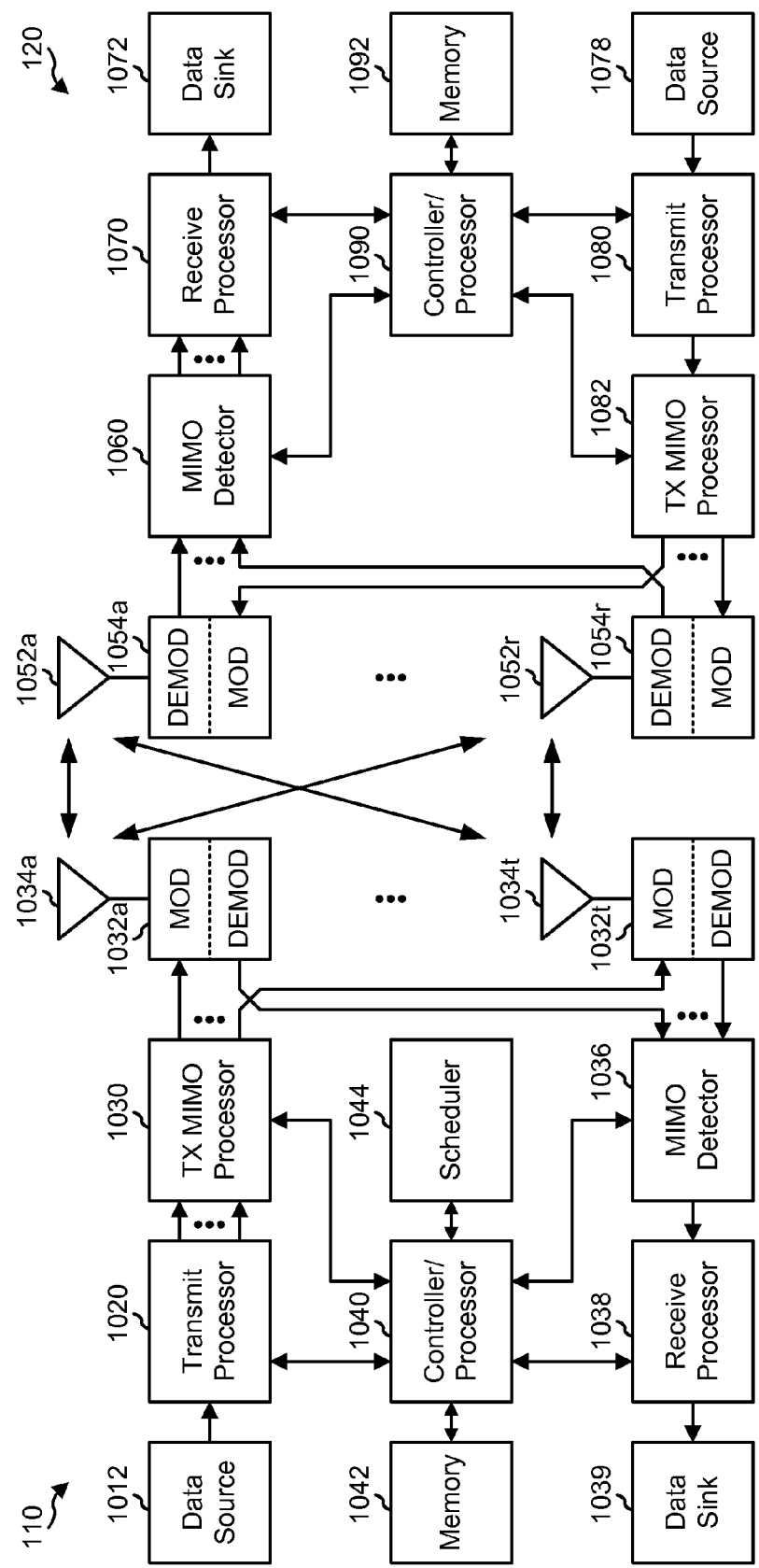
FIG. 10 is a simplified block diagram of several sample aspects of communication components that may be configured to support communication as taught herein.

FIG. 10 illustrates a block diagram of a design of an eNode B 110 and a UE 120, which may be one of the eNode Bs and one of the UEs discussed herein in relation to the various aspects of the disclosure. In this design, Node B 110 is equipped with T antennas 1034*a* through 1034*t*, and UE 120 is equipped with R antennas 1052*a* through 1052*r* where, in general, T is greater than or equal to 1 and R is greater than or equal to 1.

At Node B 110, a transmit processor 1020 may receive data for unicast services and data for broadcast and/or multicast services from a data source 1012 (e.g., directly or indirectly from application server 550 in FIG. 6). Transmit processor 1020 may process the data for each service to obtain data symbols. Transmit processor 1020 may also receive scheduling information, configuration information, control information, system information and/or other overhead information from a controller/processor 1040 and/or a scheduler 1044. Transmit processor 1020 may process the received overhead information and provide overhead symbols. A transmit (TX) multiple-input multiple-output (MIMO) processor 1030 may multiplex the data and overhead symbols with pilot symbols, process (e.g., precode) the multiplexed symbols, and provide T output symbol streams to T modulators (MOD) 1032*a* through 1032*t*. Each modulator 1032 may process a respective output symbol stream (e.g., for OFDM) to obtain an output sample stream. Each modulator 1032 may further process (e.g., convert to analog, amplify, filter, and upconvert) the output sample stream to obtain a downlink signal. T downlink signals from modulators 1032*a* through 1032*t* may be transmitted via T antennas 1034*a* through 1034*t*, respectively.

At UE 120, antennas 1052*a* through 1052*r* may receive the downlink signals from Node B 110 and provide received signals to demodulators (DEMOD) 1054*a* through 1054*r*, respectively. Each demodulator 1054 may condition (e.g., filter, amplify, downconvert, and digitize) a respective received signal to obtain received samples and may further process the received samples (e.g., for OFDM) to obtain received symbols. A MIMO detector 1060 may receive and process the received symbols from all R demodulators 1054a through 1054r and provide detected symbols. A receive processor 1070 may process the detected symbols, provide decoded data for UE 120 and/or desired services to a data sink 1072, and provide decoded overhead information to a controller/processor 1090. In general, the processing by MIMO detector 1060 and receive processor 1070 is complementary to the processing by TX MIMO processor 1030 and transmit processor 1020 at Node B 110.

On the uplink, at UE 120, data from a data source 1078 and overhead information from a controller/processor 1090 may be processed by a transmit processor 1080, further processed by a TX MIMO processor 1082 (if applicable), conditioned by modulators 1054a through 1054r, and transmitted via antennas 1052a through 1052r. At Node B 110, the uplink signals from UE 120 may be received by antennas 1034, conditioned by demodulators 1032, detected by a MIMO detector 1036, and processed by a receive processor 1038 to obtain the data and overhead information transmitted by UE 120.

Controllers/processors 1040 and 1090 may direct the operation at Node B 110 and UE 120, respectively. Scheduler 1044 may schedule UEs for downlink and/or uplink transmission, schedule transmission of broadcast and multicast services, and provide assignments of radio resources for the scheduled UEs and services. Controller/processor 1040 and/or scheduler 1044 may generate scheduling information and/or other overhead information for the broadcast and multicast services.

Controller/processor 1090 may implement processes for the techniques described herein. Memories 1042 and 1092 may store data and program codes for Node B 110 and UE 120, respectively. Accordingly, group communications in the eMBMS environment can be accomplished in accordance with the various aspects disclosed herein, while still remaining compliant with the existing standards.

Figure 11:
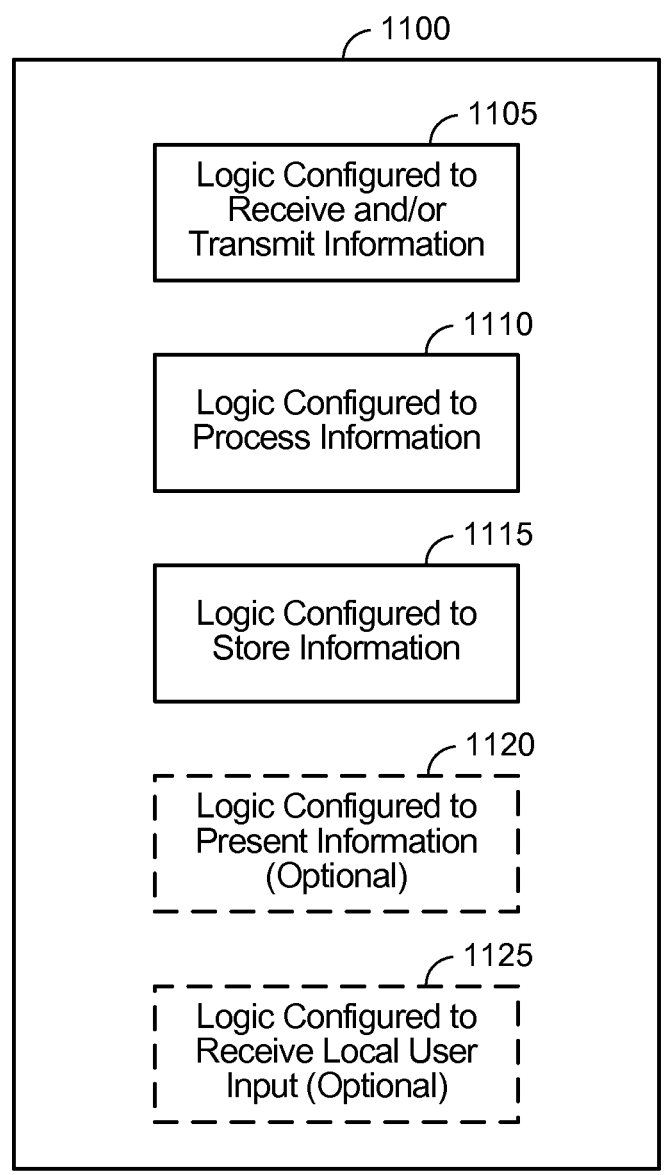
FIG. 11 illustrates a communication device 1100 that includes logic configured to perform functionality.

FIG. 11 illustrates a communication device 1100 that includes logic configured to perform functionality. The communication device 1100 can correspond to any of the above-noted communication devices, including but not limited to Node Bs 110 or 510, UEs 120 or 520, the application server 150 or 550, the network controller 130, the BM-SC 536, the content server 570, MME 532, eMBMS-GW 534, etc. Thus, communication device 1100 can correspond to any electronic device that is configured to communicate with (or facilitate communication with) one or more other entities over a network.

Referring to FIG. 11, the communication device 1100 includes logic configured to receive and/or transmit information 1105. In an example, if the communication device 1100 corresponds to a wireless communications device (e.g., UE 120, Node B 110, etc.), the logic configured to receive and/or transmit information 1105 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 1105 can correspond to a wired communications interface (e.g., a serial connection, a USB or Firewire connection, an Ethernet connection through which the Internet can be accessed, etc.). Thus, if the communication device 1100 corresponds to some type of network-based server (e.g., the application server 150, the network controller 130, the BM-SC 536, the content server 570, MME 532, eMBMS-GW 534, etc.), the logic configured to receive and/or transmit information 1105 can correspond to an Ethernet card, in an example, that connects the network-based server to other communication entities via an Ethernet protocol. As an example, the logic configured to receive and/or transmit information 1105 can include logic configured to deliver a media stream for the group call to a user device of the one or more user devices over a wireless local area network (WLAN) to which the user device is connected based on the number of the one or more user devices in the MBMS coverage area being less than the threshold. In a further example, the logic configured to receive and/or transmit information 1105 can include sensory or measurement hardware by which the communication device 1100 can monitor its local environment (e.g., an accelerometer, a temperature sensor, a light sensor, an antenna for monitoring local RF signals, etc.). The logic configured to receive and/or transmit information 1105 can also include software that, when executed, permits the associated hardware of the logic configured to receive and/or transmit information 1105 to perform its reception and/or transmission function(s). However, the logic configured to receive and/or transmit information 1105 does not correspond to software alone, and the logic configured to receive and/or transmit information 1105 relies at least in part upon hardware to achieve its functionality.

Referring to FIG. 11, the communication device 1100 further includes logic configured to process information 1110. In an example, the logic configured to process information 1110 can include at least a processor. Example implementations of the type of processing that can be performed by the logic configured to process information 1110 includes but is not limited to performing determinations, establishing connections, making selections between different information options, performing evaluations related to data, interacting with sensors coupled to the communication device 1100 to perform measurement operations, converting information from one format to another (e.g., between different protocols such as .wmv to .avi, etc.), and so on. For example, the logic configured to process information 1110 can include logic configured to determine whether a number of one or more user devices in an MBMS coverage area participating in a group call is less than a threshold. The processor included in the logic configured to process information 1110 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 1110 can also include software that, when executed, permits the associated hardware of the logic configured to process information 1110 to perform its processing function(s). However, the logic configured to process information 1110 does not correspond to software alone, and the logic configured to process information 1110 relies at least in part upon hardware to achieve its functionality.

Referring to FIG. 11, the communication device 1100 further includes logic configured to store information 1115. In an example, the logic configured to store information 1115 can include at least a non-transitory memory and associated hardware (e.g., a memory controller, etc.). For example, the non-transitory memory included in the logic configured to store information 1115 can correspond to random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. The logic configured to store information 1115 can also include software that, when executed, permits the associated hardware of the logic configured to store information 1115 to perform its storage function(s). However, the logic configured to store information 1115 does not correspond to software alone, and the logic configured to store information 1115 relies at least in part upon hardware to achieve its functionality.

Referring to FIG. 11, the communication device 1100 further optionally includes logic configured to present information 1120. In an example, the logic configured to display information 1120 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 1100. For example, if the communication device 1100 corresponds to UE 120 or 520, the logic configured to present information 1120 can include a display screen and an audio output device (e.g., speakers). In a further example, the logic configured to present information 1120 can be omitted for certain communication devices, such as network communication devices that do not have a local user (e.g., network switches or routers, remote servers, etc.). The logic configured to present information 1120 can also include software that, when executed, permits the associated hardware of the logic configured to present information 1120 to perform its presentation function(s). However, the logic configured to present information 1120 does not correspond to software alone, and the logic configured to present information 1120 relies at least in part upon hardware to achieve its functionality.

Referring to FIG. 11, the communication device 1100 further optionally includes logic configured to receive local user input 1125. In an example, the logic configured to receive local user input 1125 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 1100. For example, if the communication device 1100 corresponds to UE 120 or 520, the logic configured to receive local user input 1125 can include a display screen (if implemented a touch-screen), a keypad, etc. In a further example, the logic configured to receive local user input 1125 can be omitted for certain communication devices, such as network communication devices that do not have a local user (e.g., network switches or routers, remote servers, etc.). The logic configured to receive local user input 1125 can also include software that, when executed, permits the associated hardware of the logic configured to receive local user input 1125 to perform its input reception function(s). However, the logic configured to receive local user input 1125 does not correspond to software alone, and the logic configured to receive local user input 1125 relies at least in part upon hardware to achieve its functionality.

Referring to FIG. 11, while the configured logics of 1105 through 1125 are shown as separate or distinct blocks in FIG. 11, it will be appreciated that the hardware and/or software by which the respective configured logic performs its functionality can overlap in part. For example, any software used to facilitate the functionality of the configured logics of 1105 through 1125 can be stored in the non-transitory memory associated with the logic configured to store information 1115, such that the configured logics of 1105 through 1125 each performs their functionality (i.e., in this case, software execution) based in part upon the operation of software stored by the logic configured to store information 1115. Likewise, hardware that is directly associated with one of the configured logics can be borrowed or used by other configured logics from time to time. For example, the processor of the logic configured to process information 1110 can format data into an appropriate format before being transmitted by the logic configured to receive and/or transmit information 1105, such that the logic configured to receive and/or transmit information 1105 performs its functionality (i.e., in this case, transmission of data) based in part upon the operation of hardware (i.e., the processor) associated with the logic configured to process information 1110. Further, the configured logics or "logic configured to" of 1105 through 1125 are not limited to specific logic gates or elements, but generally refer to the ability to perform the functionality describe herein (either via hardware or a combination of hardware and software). Thus, the configured logics or "logic configured to" of 1105 through 1125 are not necessarily implemented as logic gates or logic elements despite sharing the word "logic." Other interactions or cooperation between the configured logics 1105 through 1125 will become clear to one of ordinary skill in the art from a review of the embodiments described below in more detail.

Figure 12:
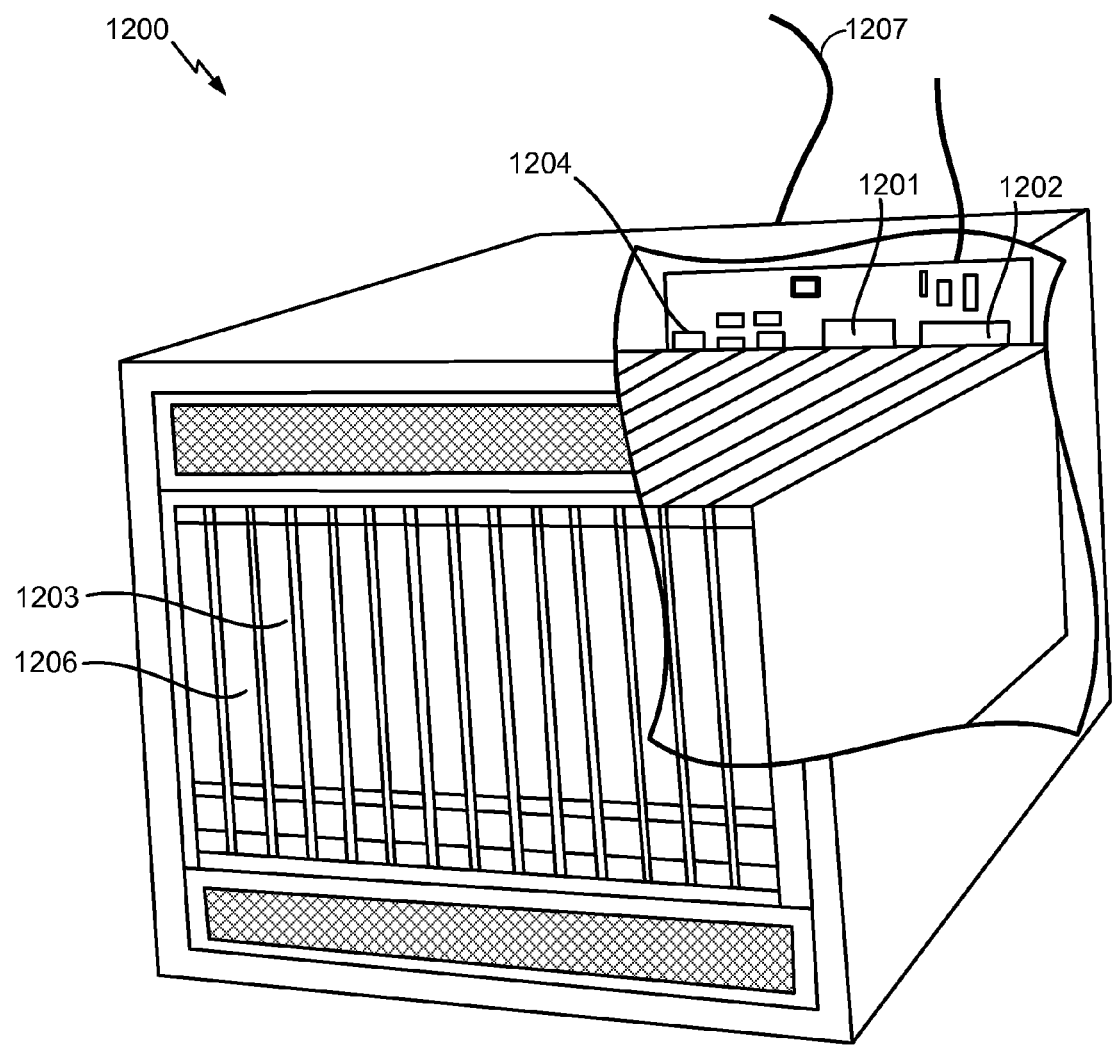
FIG. 12 illustrates an exemplary server according to various aspects of the disclosure.

Various aspects of the disclosure may be implemented on any of a variety of commercially available server devices, such as server 1200 illustrated in FIG. 12. In an example, the server 1200 may correspond to one example configuration of the application server 550 described above. In FIG. 12, the server 1200 includes a processor 1201 coupled to volatile memory 1202 and a large capacity nonvolatile memory, such as a disk drive 1203. The server 1200 may also include a floppy disc drive, compact disc (CD) or DVD disc drive 1206 coupled to the processor 1201. The server 1200 may also include network access ports 1204 coupled to the processor 1201 for establishing data connections with a network 1207, such as a local area network coupled to other broadcast system computers and servers or to the Internet. In context with FIG. 11, it will be appreciated that the server 1200 of FIG. 12 illustrates one example implementation of the communication device 1100, whereby the logic configured to transmit and/or receive information 1105 corresponds to the network access points 1204 used by the server 1200 to communicate with the network 1207, the logic configured to process information 1110 corresponds to the processor 1201, and the logic configuration to store information 1115 corresponds to any combination of the volatile memory 1202, the disk drive 1203 and/or the disc drive 1206. The optional logic configured to present information 1120 and the optional logic configured to receive local user input 1125 are not shown explicitly in FIG. 12 and may or may not be included therein. Thus, FIG. 12 helps to demonstrate that the communication device 1100 may be implemented as a server.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable media embodying a method for group communications over evolved multimedia broadcast/multicast services (eMBMS). Accordingly, the disclosure is not limited to illustrated examples and any means for performing the functionality described herein are included in aspects of the disclosure.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for group communications over multimedia broadcast/multicast services (MBMS), comprising:
    determining whether a number of one or more user devices in an MBMS coverage area participating in a group call is less than a threshold, and based on the number of the one or more user devices being less than the threshold:
        notifying a user device of the one or more user devices that a media stream for the group call will be delivered over a wireless local area network (WLAN) to which the user device is connected;
        notifying the user device that a supplemental media stream for the group call will be delivered over a unicast service;
        delivering the media stream for the group call to the user device over the WLAN; and
        delivering the supplemental media stream to the user device over the unicast service.

2. The method of claim 1, wherein the media stream comprises group communication media generated during the group call.

3. The method of claim 2, wherein the media stream comprises a lower bandwidth version of the group communication media generated during the group call than would be delivered over MBMS.

4. The method of claim 1, wherein the media stream comprises an audio stream, an image stream, and/or a video stream.

5. The method of claim 1, wherein the supplemental media stream is encoded at a higher bitrate than an encoding bitrate of the media stream.

6. The method of claim 1, wherein the user device combines the media stream and the supplemental media stream for playback at the user device.

7. The method of claim 1, further comprising:
    delivering the media stream to a second user device of the one or more user devices over a unicast service based on whether the second user device is connected to a WLAN.

8. The method of claim 1, further comprising:
    delivering all content for the group call over MBMS to the one or more user devices based on the number of the one or more user devices in the MBMS coverage area being greater than the threshold.

9. The method of claim 8, further comprising:
    notifying the one or more user devices that the one or more user devices will receive a higher bandwidth media stream for the group call over MBMS.

10. The method of claim 9, wherein the higher bandwidth media stream comprises a higher bandwidth version of the media stream that was delivered over the WLAN.

11. The method of claim 8, wherein the delivering is performed in response to determining that a high priority user has joined the group call.

12. The method of claim 8, wherein the delivering is performed in response to determining that the number of the one or more user devices in the MBMS coverage area is greater than the threshold.

13. The method of claim 8, further comprising:
    ceasing delivery of a supplemental media stream to the user device over a unicast service.

14. The method of claim 1, wherein the determining and delivering are performed by an application server in communication with the user device.

15. An apparatus for group communications over multimedia broadcast/multicast services (MBMS), comprising:
    logic configured to determine whether a number of one or more user devices in an MBMS coverage area participating in a group call is less than a threshold;
    logic configured to notify a user device of the one or more user devices that a media stream for the group call will be delivered over a wireless local area network (WLAN) to which the user device is connected based on the number of the one or more user devices being less than the threshold;
    logic configured to notify the user device that a supplemental media stream for the group call will be delivered over a unicast service based on the number of the one or more user devices being less than the threshold;
    logic configured to deliver the media stream for the group call to the user device over the WLAN based on the number of the one or more user devices being less than the threshold; and
    logic configured to deliver the supplemental media stream to the user device over the unicast service based on the number of the one or more user devices being less than the threshold.

16. The apparatus of claim 15, wherein the media stream comprises group communication media generated during the group call.

17. The apparatus of claim 16, wherein the media stream comprises a lower bandwidth version of the group communication media generated during the group call than would be delivered over MBMS.

18. The apparatus of claim 15, wherein the media stream comprises an audio stream, an image stream, and/or a video stream.

19. The apparatus of claim 15, wherein the supplemental media stream is encoded at a higher bitrate than an encoding bitrate of the media stream.

20. The apparatus of claim 15, wherein the user device combines the media stream and the supplemental media stream for playback at the user device.

21. The apparatus of claim 15, further comprising:
logic configured to deliver the media stream to a second user device of the one or more user devices over a unicast service based on whether the second user device is connected to a WLAN.

22. The apparatus of claim 15, further comprising:
logic configured to deliver all content for the group call over MBMS to the one or more user devices based on the number of the one or more user devices in the MBMS coverage area being greater than the threshold.

23. The apparatus of claim 22, wherein delivering all content for the group call over MBMS is performed in response to determining that a high priority user has joined the group call.

24. The apparatus of claim 22, wherein the delivering all content for the group call over MBMS is performed in response to determining that the number of the one or more user devices in the MBMS coverage area is greater than the threshold.

25. An apparatus for group communications over multimedia broadcast/multicast services (MBMS), comprising:
means for determining whether a number of one or more user devices in an MBMS coverage area participating in a group call is less than a threshold;
means for notifying a user device of the one or more user devices that a media stream will for the group call be delivered over a wireless local area network (WLAN) to which the user device is connected based on the number of the one or more user devices being less than the threshold;
means for notifying the user device that a supplemental media stream for the group call will be delivered over a unicast service based on the number of the one or more user devices being less than the threshold;
means for delivering the media stream for the group call to the user device over the WLAN based on the number of the one or more user devices being less than the threshold; and
means for delivering the supplemental media stream to the user device over the unicast service based on the number of the one or more user devices being less than the threshold.

26. A non-transitory computer-readable medium for group communications over multimedia broadcast/multicast services (MBMS), comprising:
at least one instruction to determine whether a number of one or more user devices in an MBMS coverage area participating in a group call is less than a threshold;
at least one instruction to notify a user device of the one or more user devices that a media stream for the group call will be delivered over a wireless local area network (WLAN) to which the user device is connected based on the number of the one or more user devices being less than the threshold;
at least one instruction to notify the user device that a supplemental media stream for the group call will be delivered over a unicast service based on the number of the one or more user devices being less than the threshold;
at least one instruction to deliver the media stream for the group call to the user device over the WLAN based on the number of the one or more user devices being less than the threshold; and
at least one instruction to deliver the supplemental media stream to the user device over the unicast service based on the number of the one or more user devices being less than the threshold.

* * * * *